Dec. 12, 1967  W. KASTEN  3,357,236
CONTAMINATION INDICATOR
Filed June 9, 1965  2 Sheets-Sheet 1
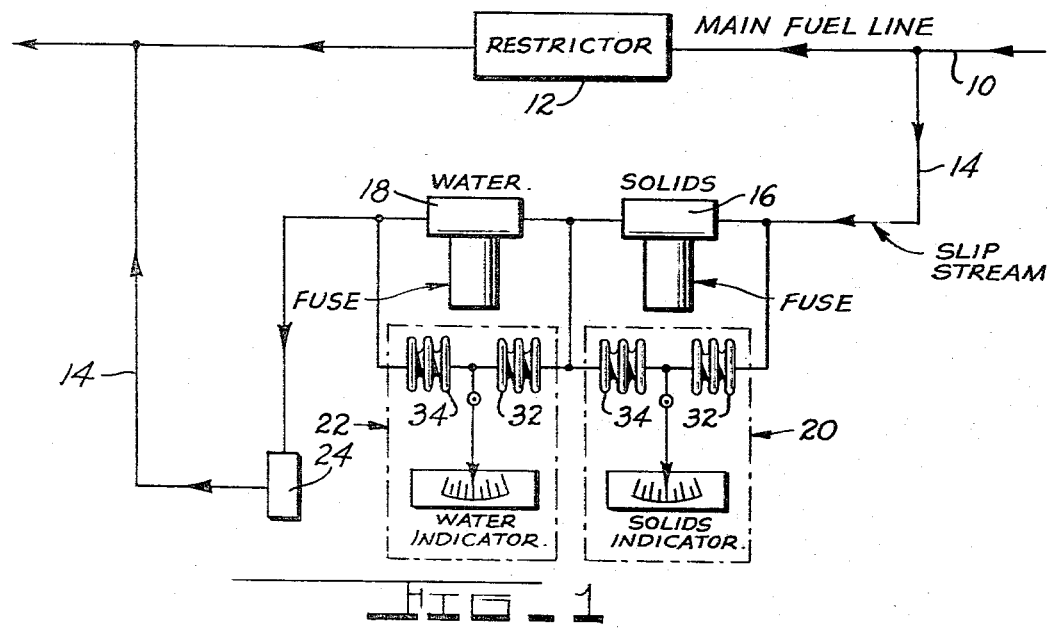
FIG_1
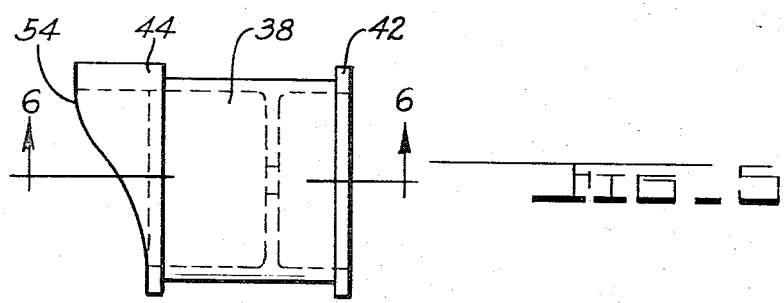
FIG_5
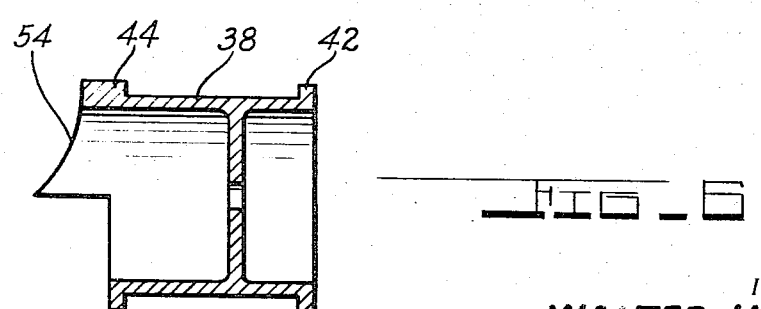
FIG_6
INVENTOR.
WALTER KASTEN.
BY
*William N. Antonis*
ATTORNEY.

Dec. 12, 1967 W. KASTEN 3,357,236
CONTAMINATION INDICATOR
Filed June 9, 1965 2 Sheets-Sheet 2
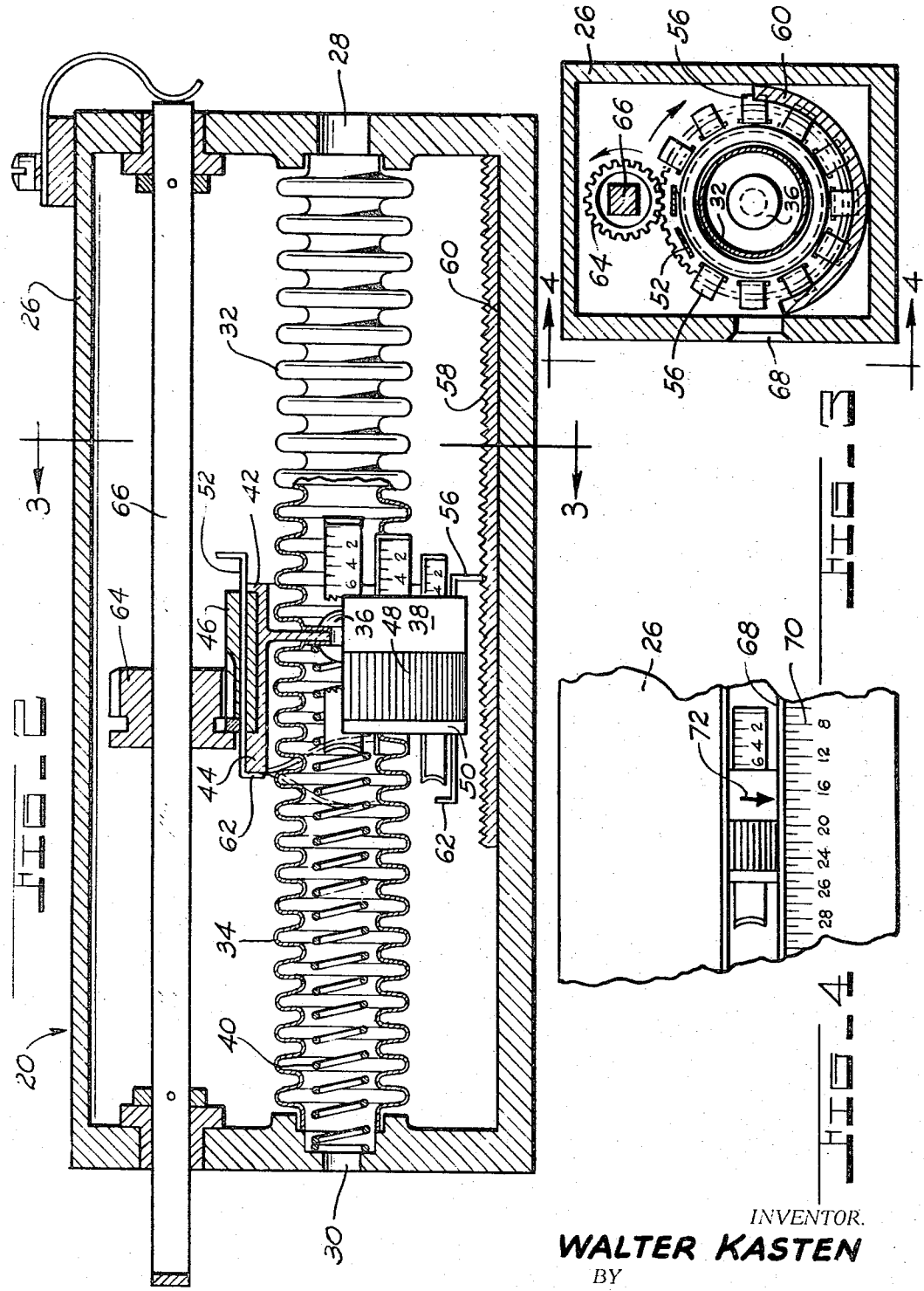
INVENTOR.
WALTER KASTEN
BY
*William N. Antonis*
ATTORNEY.

United States Patent Office 3,357,236
Patented Dec. 12, 1967

3,357,236
CONTAMINATION INDICATOR
Walter Kasten, Madison Heights, Mich., assignor to The Bendix Corporation, Madison Heights, Mich., a corporation of Delaware
Filed June 9, 1965, Ser. No. 462,704
6 Claims. (Cl. 73—61)

ABSTRACT OF THE DISCLOSURE

The following relates to contamination indicators which are used in a system for measuring the amount of solid and water contaminants in fuel. The system utilizes two filter units in series flow relation, one of which removes only solid contaminants and the other of which removes only water contaminants from the fuel flowing therethrough, and two identical contamination indicators, one of which is connected to one of the filter units and the other of which is connected to the other of the filter units, which measure the rate of differential pressure increase across each of the filter units.

---

One of the objects of this invention is to provide a contamination indicator system which distinguishes between solid and water contamination.

Another object of this invention is to provide a contamination indicator system which indicates the amount of solid and/or water contamination in the fuel being monitored during any predetermined interval of time.

Another object of this invention is to provide a contamination indicator which indicates the amount of contamination by sensing the pressure differentials across a filter or fuse element resulting from the trapping of solid and/or water contamination.

A further object of this invention is to provide a system for measuring the amount of solid and water contaminants in fuel comprising a par of contamination sensitive fuses in series flow relationship, one of which is non-hygroscopic and removes only solid contaminants from the fuel flowing therethrough and the other of which is hygroscopic and removes only water contaminants in the fuel flowing therethrough, pressure responsive means for sensing the pressure differential across each of said fuses, and indicator means operatively connected to and movably controlled by said pressure responsive means for indicating the solid and/or water contamination levels of said fuel.

More specifically, it is an object of this invention to provide a contamination measuring indicator which measures the rate of differential pressure increase across a filter or fuse element to indicate the amount of fuel contamination per unit of measurement.

The above and other objects and features of this invention will become apparent from the following description taken in connection with the accompanying drawings which form a part of this disclosure and in which:

FIGURE 1 shows a diagrammatical arrangement of the invention;

FIGURE 2 is a view partially in section of one of the pressure responsive contamination indicator devices shown in FIGURE 1;

FIGURE 3 is a sectional view taken substantially along line 3—3 of FIGURE 2 with portions broken away for clarity;

FIGURE 4 is a fragmentary section taken substantially along line 4—4 of FIGURE 3;

FIGURE 5 is a plan view of the resetting cam drum; and

FIGURE 6 is a sectional view taken along line 6—6 of FIGURE 5.

Referring to FIGURE 1, which shows a diagrammatical arrangement of the invention, it will be seen that the main fuel line 10 contains a restrictor 12, or other suitable means, which causes flow of a portion of the fuel through the secondary line 14. Located in the secondary line in series flow relationship are two filtering units 16 and 18, each containing a single filter or fuse element (not shown) of the type described and claimed in Kasten Patents Nos. 3,117,925 and 3,151,071. The fuse element of filter unit 16 is rendered non-hygroscopic by any suitable means, such as impregnation of the paper washers with an epoxy or other suitable type of resin. The fuse element of filter unit 18 is formed of untreated paper washers which are hygroscopic. Thus, the fuse element of filter unit 16 will trap only solid contaminants and will permit water contaminants in the fuel to flow therethrough. However, any such water contaminants will be absorbed by the fuse of filter unit 18 because of its hygroscopic characteristics. Through such an arrangement it will be obvious that filter unit 16 traps only solid contaminants whereas filter unit 18 traps only water contaminants. It will be understood that, although the fuse elements of Patents 3,117,925 and 3,151,071 are of the paper washer type, any suitable non-hygroscopic and hygroscopic elements could be utilized in the practice of this invention.

Operatively connected to each of the filter units 16 and 18 are identical pressure responsive indicator devices, designated generally by the numerals 20 and 22, which indicate the amount of each type of contamination per unit of measurement by measuring the rate of differential pressure increase across the fuse elements. Since this pressure measurement is proportional to the contamination level of the fuel, it is possible to measure the contamination level of each type of contaminant for any unit of measurement or time interval. A positive displacement fluid motor 24, which is located downstream of the filter units 16 and 18 and is actuated by the flow passing through the sensing fuses, is utilized to control the indicator devices 20 and 22 in a manner hereinafter described.

Referring to FIGURE 2, it will be seen that the solids contamination indicator device 20, which is identical with the water contamination device 22, includes a housing 26 having an upstream pressure port 28 and a downstream pressure port 30. Located within the housing are two pressure sensing bellows 32 and 34, the first of which has its open end connected to the upstream pressure port 28 and the second of which has its open end connected to the downstream pressure port 30. The closed ends are attached by a rivet 36, or other suitable means to a resetting cam drum 38. A compensating and reset spring 40 is located within the downstream pressure sensing bellows 34 for urging the drum 38 towards the upstream pressure port 28.

The resetting cam drum 38 includes two flanges 42 and 44 between which is located reed barrel 46. The reed barrel is made of nylon or other suitable bearing material which is also an electrical insulator and is so dimensioned that it can rotate freely around the resetting cam drum. Gear teeth 48 are cut on the outer diameter of the reed barrel and extend about one-half the width of the reed barrel. Attached near one edge of the reed barrel is a slip ring 50 which is an electrical conductor. Extending through the wall of the reed barrel and spaced at regular angular intervals are a plurality of slots, each of which contains an indicator reed 52. Each indicator reed is made of a thin metal strip which is an electrical conductor and has a length which is equal to the width of the resetting cam drum 38 at the maximum height of the cam 54. It will be noted that the right end 56 of each of the indicator reeds is bent at a right angle so that it will engage the serrations 58 of the semi-cylindrical retention trough 60, and that the left end 62 of each of the indicator reeds is bent at a right angle so that it will engage the surface of cam 54. The right end of each indicator reed is provided with graduations and numerals for indicating the amount of contamination through a window 68 which extends the length of the housing. These graduations, which indicate the amount of contamination, are related to the rate of pressure differential rise. The reed barrel 46 is rotated through means of a drive pinion 64 which is connected to and driven by a shaft 66. The drive shaft is operatively connected to and caused to rotate by the previously mentioned fluid motor 24. Thus, rotation of the reed barrel 46 is directly proportional to the flow through the filter units and fluid motor and can be designed to rotate at the desired r.p.m. so as to permit an indication of the amount of contamination per unit of measurement, e.g. milligrams per liter or milligrams per gallon.

Operation of the contamination indicator device 20 will be as follows: Since this device operates on the principle that the rate of differential pressure increase across the fuse element of the filter unit is proportional to the amount of solid contamination per unit of measurement, it will be understood that if there is no measurable solid contamination in the fuel, the fuse element will not tend to become clogged and there will be no change in the differential pressure across the fuse element. Consequently, the bellow 32 and 34 will remain in the same axial position and the reed barrel will be caused to revolve at a given axial position. Since all of the indicator reeds 52 must pass the high point or resetting point of the cam 54 during any complete revolution of the reed barrel, if there is no axial movement of the reed barrel, all of the indicator reeds will become aligned with the trailing face of the reed barrel and will indicate zero contamination per unit of measurement. However, if, during any part of a revolution, solid contamination tends to clog the fuse element and increase the differential pressure thereacross, then the drum 38 and reed barrel 46 will be caused to move in a leftward direction. Since the right ends 56 of half of the indicator reeds 52 always engage the serrations 58 of the retention trough 60, such leftward movement of the reed barrel will result in relative movement between the reed barrel and those indicator reeds which are restrained from axial movement by the serrations, so as to proportionally expose the graduated indicating portions of the restrained reeds. The exposed graduated indicating portions can be read through axially extending window 68 as the indicating reeds pass thereby. In the device shown, it will be noted that this relative lengthwise displacement for any given indicator reed takes place only during one-half of each revolution, the other half being used to "reset" the reed to its zero position.

If instead of measuring only the amount of contaminants per unit of measurement, e.g. milligrams per liter, it is desired to make the measurements cumulative over a predetermined period of time, that is, measure the total amount of contamination in the fuel being checked, a separate graduated scale 70 may be utilized, as shown in FIGURE 4, said cumulative contamination being indicated by the arrow 72. Thus, as the pores of the associated fuse element become increasingly clogged due to the accumulation of contaminants, the differential pressure across the fuse element will progressively increase and cause the drum 38 and reed barrel 46 to move from its starting rightward position to some leftward position determined by the resulting differential pressure. The total cumulative amount of contamination for a given period could thereby be determined from scale 70.

If it is desired to incorporate a shut-off or alarm system in this device, an electrical circuit can be utilized which includes the drive shaft 66, pinion 64, slip ring 50 on reed barrel 46, indicator reeds 52, and reed retention trough 60. Thus, if the differential pressure increases during any one-half or less of a revolution of the reed barrel and exceeds the height of the cam 54, then when the left end 62 of the indicator reed contacts the slip ring 50, a closed electrical circuit will occur, since the right end 56 of the indicator reed is in contact with the retention trough, and the alarm or shut off device will be actuated.

If it is desired to amplify the indicator reed movements with respect to the reed barrel, or to have the measurement indication located remote from the fuse location, or to have several indicators at different locations, one or several potentiometers can be used. For example, a resistance wire could be coiled around each of the indicator reeds and connected to the potentiometer to measure reed movements.

The indicator device 22, which measures water contamination, functions in the same manner as the indicator device 20 and need not be described again. As disclosed in Kasten Patents Nos. 3,117,925 and 3,151,071, water contaminants in the fuel will be absorbed by the washers of the fuse in filtering unit 18. Such absorption causes swelling of the washers, a reduction in the size of the fuse pores, and a consequent increase in the differential pressure thereacross which is sensed by the indicator device in the manner previously described.

If desired, the full flow of fuel could be sent through filtering units 16 and 18, provided the capacity of each were suitably increased. The operation of such a full flow system would be essentially the same as that which has been described.

Those acquainted with this art will readily understand that the invention herein set forth is not necessarily limited and restricted to the precise and exact details presented and that various changes and modifications may be resorted to without departing from the spirit of the invention. Accordingly, I do not desire to be limited to the specific details described herein, primarily for purposes of illustration, but instead desire protection falling within the scope of the appended claims.

Having thus described the various features of the invention, what I claim as new and desire to secure by Letters Patent is:

1. An indicator device for indicating the amount of contamination in a quantity of fuel by measuring the rate of differential pressure increase across a filtering element which traps the contaminants in the fuel flowing therethrough comprising a housing having upstream and downstream pressure ports communicating respectively with the upstream and downstream sides of said filtering element, a semi-cylindrical retention trough located in said housing, said retention trough having serrations formed thereon, first and second pressure sensing bellows located in said housing and having the open ends thereof communicating respectively with said upstream and downstream pressure ports, a non-rotatable drum having a cam surface formed on one end thereof, said drum being fixedly connected to the closed ends of said first and second bellows and axially movable therewith as the pressure differential between the upstream and downstream pressure ports increases, a rotatable reed barrel located on said drum and movable axially therewith, said reed barrel having a plurality of axially extending slots disposed at predetermined angular positions therearound, drive means for rotating said reed barrel at a speed which is directly proportional to the flow of fuel through said filtering element, and a plurality of indicator reeds located in said slots and having graduated contamination indicating scales which are proportionally exposed upon movement of said reed barrel relative to said reeds, said reeds having one end thereof adapted for engaging the serrations of said retention trough during one-half of each complete revolution of the reed barrel to thereby permit relative axial movement between said reed barrel and the reeds in engagement with said serrations upon axial movement of said drum, said reeds having the other end thereof adapted for continuously engaging the cam surface of said drum to reset said reeds to a zero indication after disengagement thereof from said trough.

2. An indicator device for indicating the amount of contamination in a quantity of fuel by measuring the rate of differential pressure increase across a filtering means which traps the contaminants in the fuel flowing therethrough comprising a housing having upstream and downstream pressure ports communicating respectively with the upstream and downstream sides of said filtering means, a retention trough located in said housing, said retention trough having serrations formed thereon, axially movable pressure responsive means communicating with said upstream and downstream pressure ports, a non-rotatable drum having a cam surface formed thereon, said drum being fixedly connected to said pressure responsive means and axially movable therewith as the pressure differential between the upstream and downstream pressure ports increases, a rotatable annular member located on said drum and movable axially therewith, drive means for rotating said annular member at a speed which is directly proportional to the flow of fuel through said filtering means, and a plurality of indicating members operatively connected to and rotatable with said annular member for progressively indicating the amount of contamination in a quantity of fuel upon movement of said annular member relative to said indicating members, said indicating members having one end thereof adapted for engaging the serrations of said retention trough during a portion of each complete revolution of said annular member to thereby permit relative axial movement between said annular member and the indicating members in engagement with said serrations upon axial movement of said drum, said indicating members having the other end thereof adapted for continuously engaging the cam surface of said drum to reset said indicating members to a zero indication after disengagement thereof from said trough.

3. An indicator device for indicating the amount of contamination in a quantity of fluid by measuring the rate of differential pressure increase across a filtering means which traps the contaminants in the fluid flowing therethrough comprising a housing having upstream and downstream pressure ports communicating respectively with the upstream and downstream sides of said filtering means, axially movable pressure responsive means located in said housing and communicating with said upstream and downstream pressure ports, a non-rotatable drum fixedly connected to said pressure responsive means and axially movable therewith as the pressure differential between the upstream and downstream pressure ports increases, a rotatable annular member located on said drum and movable axially therewith, drive means for rotating said annular member at a speed which is directly proportional to the flow of fluid through said filtering means, indicating means operatively connected to and rotatable with said annular member for progressively indicating the amount of contamination in a quantity of fluid upon movement of said annular member relative to said indicating means, means for permitting relative movement between said indicating means and said annular member during a portion of each complete revolution of said annular member, and means for resetting said indicating means to zero during the remaining portion of each complete revolution of said annular member.

4. An indicator device for indicating the amount of contamination in a quantity of fluid by measuring the rate of differential pressure increase across a filtering means which traps the contaminants in the fluid flowing therethrough comprising a housing having upstream and downstream pressure ports communicating respectively with the upstream and downstream sides of said filtering means, pressure responsive means located in said housing and communicating with said upstream and downstream pressure ports, said pressure responsive means being axially movable as the pressure differential between the upstream and downstream pressure ports increases, an annular member operatively connected to said pressure responsive means for axial movement therewith and rotary movement with respect thereto, drive means for rotating said annular member at a speed which is proportional to the flow of fluid through said filtering means, and indicating means operating connected to said annular member for progressively indicating the amount of contamination in a quantity of fluid upon movement of said annular member relative to said indicating means.

5. An indicator device for indicating the amount of contamination in a quantity of fluid by measuring the rate of differential pressure increase across a filtering means which traps the contaminants in the fluid flowing therethrough comprising a housing having upstream and downstream pressure ports communicating respectively with the upstream and downstream sides of said filtering means, first and second relatively movable members located in said housing, pressure responsive means operatively connected to said first member for causing axial movement thereof as the pressure differential between the upstream and downstream pressure ports increases, drive means for rotating said second member at a speed which is proportional to the flow of fluid through said filtering means, and indicating means operatively connected to said first and second members for indicating the amount of contamination in a quantity of fluid upon relative movement between said members.

6. A system for measuring the amount of solid and water contaminants in fuel comprising a first non-hygroscopic filtering element capable of removing only solid contaminants from the fuel, a second hygroscopic filtering element in series flow relationship with said first filtering element, said second filtering element being capable of removing the water contaminants remaining in said fuel after passing through said first filtering element, first and second indicator mechanisms operatively connected to said first and second filtering elements respectively for indicating the amount of contamination trapped therein by measuring the rate of differential pressure increase across each of said filtering elements, said first and second indicator mechanisms each including first and second relatively movable members, pressure responsive means operatively connected to said first member for causing axial movement thereof as the pressure differentia across the filter element to which it is connected increases, drive means for rotating said second member at a speed which is proportional to the flow of fuel through said filtering elements, and indicating means operatively connected to said first and second members for indicating the amount of contamination in a quantity of fuel upon relative movement between said memebrs.

References Cited
UNITED STATES PATENTS

| | | | |
|---|---|---|---|
| 2,772,569 | 12/1956 | Ruge | 73—407 X |
| 2,985,020 | 5/1961 | Fisher | 73—407 |
| 3,167,949 | 2/1965 | Stenzel et al. | 75—61 X |

DAVID SCHONBERG, *Primary Examiner.*